(12) United States Patent
Wittenberg et al.

(10) Patent No.: US 11,002,819 B2
(45) Date of Patent: May 11, 2021

(54) ANGULAR RESOLUTION OF TARGETS USING SEPARATE RADAR RECEIVERS

(71) Applicant: The Boeing Company, Chicago, IL (US)

(72) Inventors: Peter S. Wittenberg, Creve Coeur, MO (US); Simon L. Haxton, Long Beach, CA (US); Jason R. Smith, Seattle, WA (US); Peter Petre, Oak Park, CA (US)

(73) Assignee: The Boeing Company, Chicago, IL (US)

(*) Notice: Subject to any disclaimer, the term of this patent is extended or adjusted under 35 U.S.C. 154(b) by 295 days.

(21) Appl. No.: 15/960,958

(22) Filed: Apr. 24, 2018

(65) Prior Publication Data

US 2019/0324108 A1 Oct. 24, 2019

(51) Int. Cl.
*G01S 3/50* (2006.01)
*G01S 7/292* (2006.01)

(52) U.S. Cl.
CPC ............ *G01S 3/50* (2013.01); *G01S 7/292* (2013.01)

(58) Field of Classification Search
None
See application file for complete search history.

(56) References Cited

U.S. PATENT DOCUMENTS

| | | | |
|---|---|---|---|
| 5,325,095 A | 6/1994 | Vadnais et al. |
| 5,402,520 A | 3/1995 | Schnitta |
| 5,499,029 A | 3/1996 | Bashforth et al. |
| 5,504,487 A | 4/1996 | Tucker |
| 5,694,474 A | 12/1997 | Ngo et al. |
| 6,691,073 B1 | 2/2004 | Erten et al. |
| 7,403,144 B1 | 6/2008 | Cruz-Albrecht et al. |
| 7,474,756 B2 | 1/2009 | Rickard et al. |
| 7,822,698 B1 | 10/2010 | Cruz-Albrecht et al. |
| 8,031,117 B2 | 10/2011 | Goldberg |

(Continued)

FOREIGN PATENT DOCUMENTS

| CN | 102281221 A | 12/2011 |
|---|---|---|
| CN | 105704075 A | 6/2016 |
| WO | WO 2018136144 A1 | 7/2018 |

OTHER PUBLICATIONS

Extended European Search Report dated Sep. 25, 2019 for European Patent Application No. 19170599.5, 6 pages.

(Continued)

*Primary Examiner* — Whitney Moore
(74) *Attorney, Agent, or Firm* — Sage Patent Group

(57) ABSTRACT

A radar system includes a transmitter for transmitting a radio frequency (RF) signal or a radar signal and a plurality of receivers. Each receiver receives a plurality of reflected signals created by a plurality of targets reflecting the RF signal or radar signal. The reflected signals include background noise and each of the receivers are separated by a predetermined distance. The radar system also includes a multiple input de-noiser configured to de-noise input signals from the plurality of receivers and to determine a time difference of arrival of the reflected signals between the plurality of receivers. A detection and angular resolution module is configured to determine an angular resolution between the plurality of targets using the time difference of arrival of the reflected signals between the plurality of receivers.

20 Claims, 8 Drawing Sheets

(56) References Cited

U.S. PATENT DOCUMENTS

| | | |
|---|---|---|
| 8,548,656 B1 | 10/2013 | Blake |
| 8,566,265 B1 | 10/2013 | Cruz-Albrecht et al. |
| 8,959,040 B1 | 2/2015 | Cruz-Albrecht et al. |
| 8,977,578 B1 | 3/2015 | Cruz-Albrecht et al. |
| 9,042,496 B1 | 5/2015 | Su |
| 9,749,007 B1 | 8/2017 | Martin et al. |
| 9,753,121 B1 | 9/2017 | Davis et al. |
| 9,791,564 B1 | 10/2017 | Harris et al. |
| 2005/0267377 A1 | 12/2005 | Marossero et al. |
| 2006/0208169 A1 | 9/2006 | Breed et al. |
| 2008/0204309 A1 | 8/2008 | Reeves |
| 2010/0106356 A1 | 4/2010 | Trepagnier et al. |
| 2011/0128178 A1 | 6/2011 | Dafesh et al. |
| 2012/0232418 A1 | 9/2012 | Kimura et al. |
| 2012/0250748 A1 | 10/2012 | Nguyen et al. |
| 2012/0313813 A1 | 12/2012 | Brooks |
| 2014/0079248 A1 | 3/2014 | Short et al. |
| 2014/0180914 A1 | 6/2014 | Abhyanker |
| 2015/0202770 A1 | 7/2015 | Patron et al. |
| 2015/0208945 A1* | 7/2015 | Lux .................... A61B 5/113 600/430 |
| 2015/0287422 A1 | 10/2015 | Short et al. |
| 2016/0054432 A1 | 2/2016 | Lilburn et al. |
| 2016/0072543 A1 | 3/2016 | Abrishamkar et al. |
| 2016/0171974 A1 | 6/2016 | Hannun et al. |
| 2016/0261793 A1 | 9/2016 | Sivan |
| 2017/0153318 A1 | 6/2017 | Melzer et al. |
| 2017/0199270 A1 | 7/2017 | Huemer et al. |
| 2017/0212205 A1 | 7/2017 | Bialer et al. |
| 2018/0089558 A1 | 3/2018 | Wittenberg et al. |
| 2018/0164406 A1 | 6/2018 | Culkin |
| 2018/0197089 A1 | 7/2018 | Krasser et al. |
| 2019/0120932 A1 | 4/2019 | Smith et al. |

OTHER PUBLICATIONS

U.S. Appl. No. 62/642,455, filed Mar. 13, 2018.

Wikipedia; "Recurrent neural network," downloaded from: https://en.wikipedia.org/wiki/Recurrent_neural_network on Sep. 26, 2016, 6 pages.

Wikipedia; "Rprop," downloaded from: https://en.wikipedia.org/wiki/Rprop on Sep. 25, 2016, 2 pages.

Wikipedia; "Spectral density estimation," downloaded from: https://en.wikipedia.org/wiki/Spectral_density_estimation on Sep. 26, 2016, 8 pages.

Wikipedia; "State-space representation," downloaded from: https://en.wikipedia.org/wiki/State-space_representation on Sep. 26, 2016, 11 pages.

Evangelista et al, Chapter 1: Sound Source Separation, Digital Audio Effects, $2^{nd}$ edition, Zoelzer (ed.), John Wiley and Songs, (2011), pp. 1-42.

Guldenschuh et al., Prediction Filter Design for Active Noise Cancellation Headphones, IET Signal Processing, (2013) pp. 1-8.

Cho, et al., Active Noise Cancelling using Analog NeuroChip with On-Chip Learning Capability, NIPS '98 Proceedings of the $11^{th}$ International Conference on Neural Information Processing Systems, (1998), pp. 664-670.

Chen et al., Active Cancellation System of Acoustic Noise in MR Imaging, IEEE Transactions on Biomedical Engineering, vol. 46, No. 2, (1999), pp. 186-191.

S. Choi, A. Cichocki, H.-M. Park, and S.-Y. Lee, "Blind Source Separation and Independent Component Analysis: A Review," Neural Information Processing—Letters, vol. 6, No. 1, pp. 1-57, Jan. 2005.

A. Cichocki and A. Belouchrani, "Source separation of temporally correlated sources from noisy data using a bank of band pass filters," in Proc. of Independent Component Analysis and Signal Separation (ICA—2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

C. Igel and M. Husken, "Improving the Rprop learning algorithm," in Proc. of the $2^{nd}$ Int. Symposium on Neural Computation (NC '2000), pp. 115-121, ICSC Academic Press, 2000.

R.H. Walden, "Analog-to-digital converter survey and analysis," IEEE J. Sel. Areas Commun., vol. 17, No. 4, pp. 539-548, Apr. 1999.

H. Jaeger and H. Haas, "Harnessing Nonlinearity: Predicting Chaotic Systems and Saving Energy in Wireless Communication," Science, vol. 304, No. 5667, pp. 78-80, 2004.

R. Legenstein and W. Maass, "Edge of chaos and prediction of computational performance for neural circuit models," Neural Networks, 20(3), pp. 323-334, 2007.

W. Maass, "Liquid Computing," Proc. of the Conference CiE'07: Computability in Europe 2007, Siera, Italy, 10 pages.

F. Takens, "Detecting strange attractors in turbulence," Dynamical Systems and Turbulence, Lecture Notes in Mathematics, vol. 898, 16 pages, 1981.

D. Verstraeten et al., "An experimental unification of reservoir computing methods," Neural Networks, 20(3), pp. 391-403, 2007.

H. Yap et al., "A First Analysis of the Stability of Takens' Embedding," in Proc. of the IEEE Global Conference on Signal and Information Processing (GlobalSIP) symposium on Information Processing for Big Data, 5 pages, Dec. 2014.

Appeltant, L. et al., "Information processing using a single dynamical node as complex system," Nature Communications, 2011, pp. 1-6.

Candes, Emmanuel J.; et al.; "Near-Optimal Signal Recovery From Random Projections: Universal Encoding Strategies?" IEEE Transactions on Information Theory, 2006, pp. 5406-5425, vol. 52.

Mann, Steve, et al.; "The Chirplet Transform: A Generalization of Gabor's Logon Transfrom," Proc. Vision Interface, 1991, pp. 205-212.

Extended European Search Report dated Feb. 27, 2019 for European Patent Application No. 18194748.2, 14 pages.

Chinese First Office Action dated May 21, 2020 for Chinese Patent Application No. 201710683990.7, 5 pages.

\* cited by examiner

ANGULAR RESOLUTION OF TARGETS USING SEPARATE RADAR RECEIVERS

CROSS-REFERENCE TO RELATED APPLICATIONS

This application is related to U.S. patent application Ser. No. 15/885,344, entitled "Below-Noise after Transmit (BAT) Chirp Radar, filed Jan. 31, 2018, now U.S. Pat. No. 10,921,422, issued Feb. 16, 2021, which is assigned to one of the same assignees as the present application and is incorporated herein by reference.

This application is also related to U.S. patent application Ser. No. 15/276,188, entitled "Signal Removal to Examine a Spectrum of Another Signal," filed Sep. 26, 2016, now U.S. Pat. No. 10,783,430, issued Sep. 22, 2020, which is assigned to one of the same assignees as the present application and is incorporated herein by reference.

This application is also related to U.S. patent application Ser. No. 15/073,626, entitled "Cognitive Blind Source Separator," filed Mar. 17, 2016, now U.S. Pat. No. 9,749,007, issued Aug. 29, 2017, which is assigned to one of the same assignees as the present application.

FIELD

The present disclosure relates to radars and radar systems and more particularly to a system and method for determining angular resolution of a plurality of targets using separate radar receivers.

BACKGROUND

A radar is able to resolve multiple targets if the target separation is more than the beamwidth of the radar. The beamwidth of a radar beam corresponds to the wavelength ($\lambda$) of the signal transmitted by the radar divided by the aperture or diameter (d) of the transmit antenna of the radar. Accordingly, the larger the aperture or diameter (d) of the transmit antenna, the narrower the beamwidth for angular resolution of multiple targets. For closely spaced targets, a large antenna is required to achieve a smaller beamwidth for angular resolution of multiple targets. The larger the antenna, the higher the cost. Large antennas are also difficult to integrate. Additionally, larger antennas are not applicable to some applications or environments. Multiple targets within a beam of the radar, may be separated using range or Doppler techniques for angular resolution of the targets, but these techniques require significantly long integration times. For targets that are unresolvable in range or Doppler, antenna interferometric techniques such as monopulse can be adjusted to recognize that there is not a single point target, but this technique cannot resolve multiple targets.

SUMMARY

In accordance with an embodiment, a radar system includes a transmitter for transmitting a radio frequency (RF) signal or a radar signal and a plurality of receivers. Each receiver receives a plurality of reflected signals created by a plurality of targets reflecting the RF signal or radar signal. The reflected signals include background noise and each of the receivers are separated by a predetermined distance. The radar system also includes a multiple input de-noiser configured to de-noise input signals from the plurality of receivers and to determine a time difference of arrival of the reflected signals between the plurality of receivers. A detection and angular resolution module is configured to determine an angular resolution between the plurality of targets using the time difference of arrival of the reflected signals between the plurality of receivers.

In accordance with another embodiment, a radar system includes a first receive antenna for receiving a plurality of reflected signals created by a plurality of targets reflecting a radio frequency (RF) signal or radar signal. The reflected signals include background noise. The radar system also includes a first analog-to-digital converter (ADC) that digitizes or samples the reflected signals received by the first receive antenna to provide a first digitized or sampled noisy input signal. The radar system additionally includes a second receive antenna for receiving the plurality of reflected signals created by the plurality of targets reflecting the RF signal or radar signal. The second receive antenna is spaced at a selected distance from the first receive antenna. The radar system also includes a second analog-to-digital converter (ADC) that digitizes or samples the reflected signals received by the second receive antenna to provide a second digitized or sampled noisy input signal. The radar system further includes a multiple input de-noiser configured to de-noise the noisy input signal from each ADC and to determine a time difference of arrival of the reflected signals between the first receive antenna and the second receive antenna. The radar system also includes a detection and angular resolution module configured to determine an angular resolution between the plurality of targets using the time difference of arrival of the reflected signals between the receive antennas.

In accordance with another embodiment, a method for determining an angular resolution between a plurality of targets includes transmitting a radio frequency (RF) signal or radar signal and receiving a plurality of reflected signals created by a plurality of targets reflecting the RF signal or radar signal. The reflected signals include background noise and the reflected signals are received by a first receive antenna and by a second receive antenna that are spaced a predetermined distance apart. The method also includes de-noising a first input signal from the first receive antenna by a multiple input de-noiser and de-noising a second input signal from the second receive antenna by the multiple input de-noiser. The method also includes determining a time difference of arrival of the reflected signals between the first receive antenna and the second receive antenna from the de-noised first input signal and the de-noised second input signal by the multiple input de-noiser. The method further includes determining an angular resolution between the plurality of targets using the time difference of arrival of the reflected signals between the first receive antenna and the second receive antenna.

In accordance with an embodiment and any of the previous embodiments, the multiple input de-noiser includes a plurality of neural network reservoirs that interact with each other to enhance detection of the reflected signals and determine the time difference of arrival of the reflected signals between the plurality of receivers.

In accordance with an embodiment and any of the previous embodiments, neural network reservoir weights of a second neural network reservoir of the plurality of neural network reservoirs are adjusted by a first neural network reservoir of the plurality of neural network reservoirs to enhance the detection of the reflected signals and determine the time difference of arrival of the reflected signals between the plurality of receivers.

In accordance with an embodiment and any of the previous embodiments, the multiple input de-noiser comprises a separate de-noiser associated with each receiver of the plurality of receivers, wherein the separate de-noisers each comprise a neural network reservoir that interact with each other to enhance detection of the reflected signals and determine the time difference of arrival of the reflected signals between the plurality of receivers.

In accordance with an embodiment and any of the previous embodiments, the RF signal or the radar signal transmitted by the transmitter includes a continuous wave signal.

In accordance with an embodiment and any of the previous embodiments, the transmitter includes a transmit antenna and the plurality of receivers each comprise a receive antenna, wherein a baseline between adjacent receive antennas is substantially larger than an aperture or size of the transmit antenna, wherein the baseline corresponds to the predetermined distance between the adjacent receive antennas.

In accordance with an embodiment and any of the previous embodiments, each receive antenna is configured to provide a broader signal beam and a lower gain than the transmit antenna.

In accordance with an embodiment and any of the previous embodiments, the plurality of receivers are frequency, phase and time aligned with each other and the transmitter.

In accordance with an embodiment and any of the previous embodiments, the transmitter and receivers are frequency, phase and time aligned by using one of two way time transfer between the transmitter and the receivers, or time reversal technology.

In accordance with an embodiment and any of the previous embodiments, the baseline of the first receive antenna and the second receive antenna is between about 100 and about 1000 times greater than the aperture or size of the transmit antenna.

In accordance with an embodiment and any of the previous embodiments, the first receive antenna and the second receive antenna are omnidirectional antennas.

In accordance with an embodiment and any of the previous embodiments, the first receive antenna and the second receive antenna each comprise a smaller aperture or size than the transmit antenna.

The features, functions, and advantages that have been discussed can be achieved independently in various embodiments or may be combined in yet other embodiments further details of which can be seen with reference to the following description and drawings.

DETAILED DESCRIPTION

Figure 1:
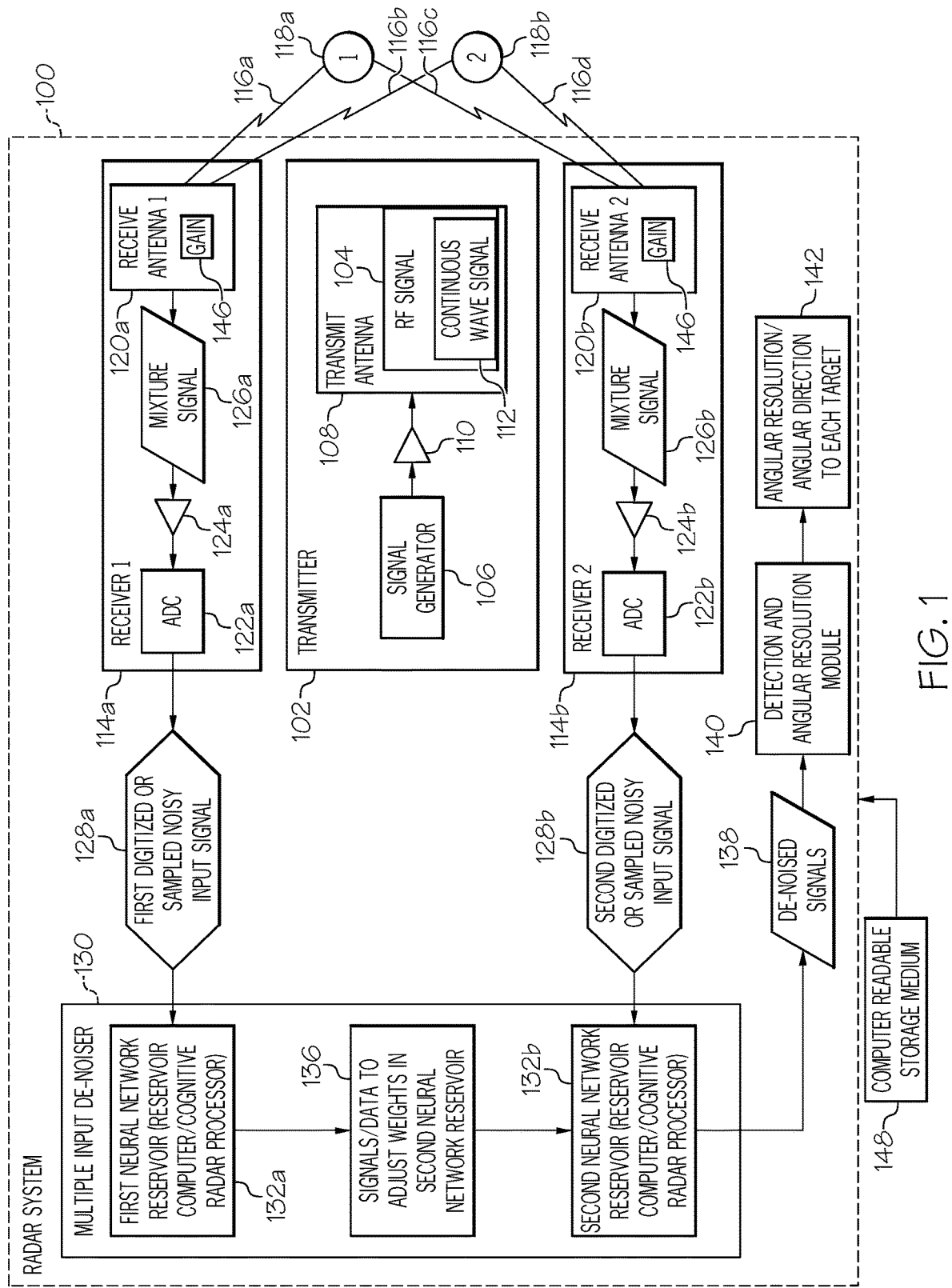
FIG. 1 is a block schematic diagram of an example of a radar system in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a block schematic diagram of an example of a radar system 100 in accordance with an embodiment of the present disclosure. The radar system 100 includes a transmitter 102 for transmitting a radio frequency (RF) signal 104 or a radar signal. The transmitter 102 includes a signal generator 106 and a transmit antenna 108. The signal generator 106 is operatively coupled or connected to the transmit antenna 108 by a transmit amplifier 110 and/or other components. In accordance with an example, the transmitter 102 transmits a continuous wave signal 112. In other embodiments, signals with other types of waveforms are transmitted. The transmitter 102 may include different components or arrangement of components in other embodiments.

Figure 3:
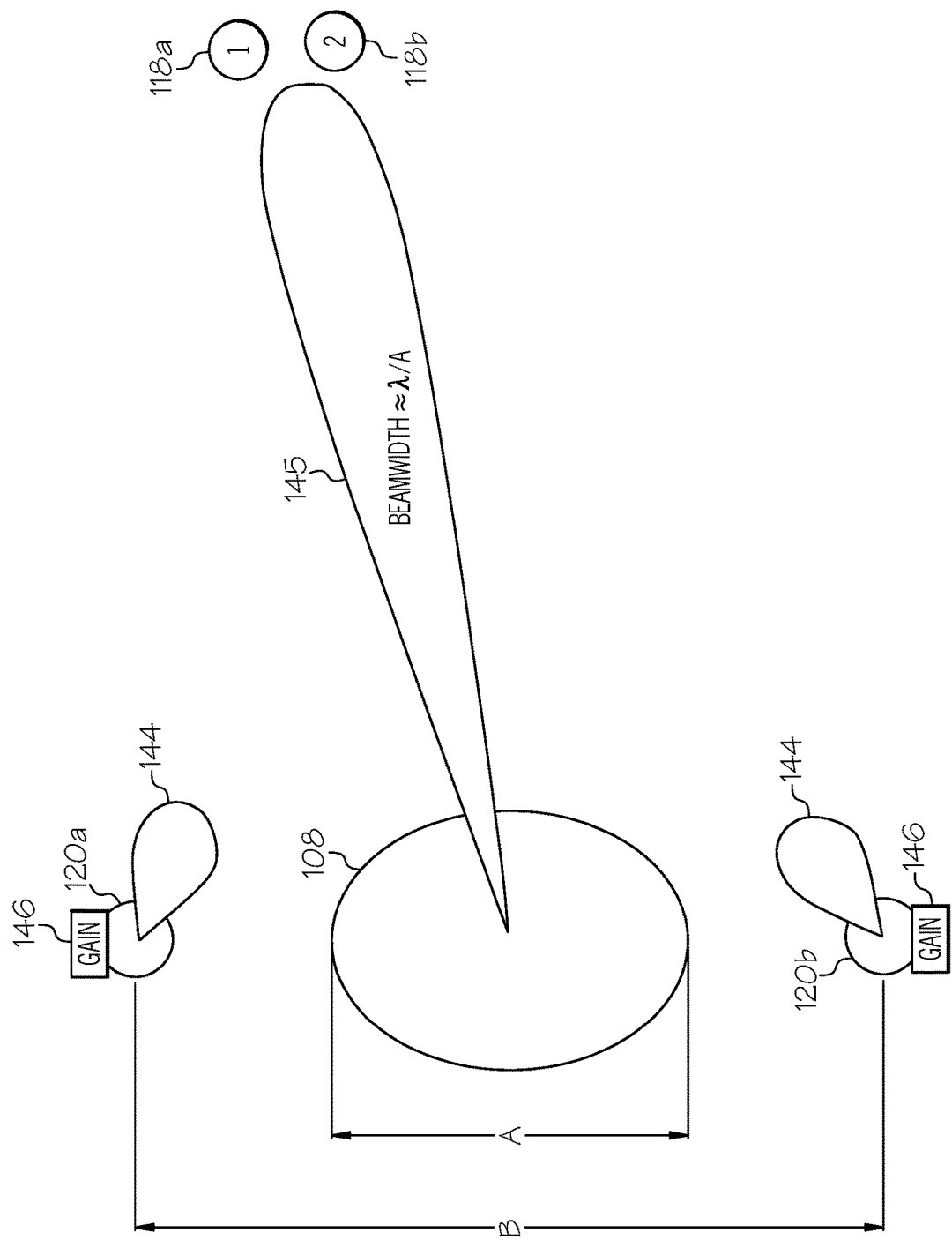
FIG. 3 is a diagram illustrating a relationship of the transmit antenna and first and second receive antennas in accordance with an embodiment of the present disclosure.

The radar system 100 also includes a plurality of receivers 114$a$-114$b$. In accordance with the exemplary embodiment shown in FIG. 1, the radar system 100 includes a first receiver 114$a$ and a second receiver 114$b$. Other embodiments may include additional receivers. Each receiver 114$a$-114$b$ is configured for receiving a plurality of reflected signals 116$a$-116$d$ created by a plurality of targets 118$a$-118$b$ reflecting the RF signal 104 or radar signal. The reflected signals 116$a$-116$d$ include background noise. Each receiver 114$a$-114$b$ includes a receive antenna 120 operatively coupled or connected to an analog-to-digital converter (ADC) 122. In accordance with an embodiment, the receive antenna 120 is operatively coupled or connected to the ADC 122 by a receive amplifier 124 and/or other components. In the exemplary embodiment shown in FIG. 1, the first receiver 114$a$ includes a first receive antenna 120$a$ coupled to a first ADC 122$a$ by a first receive amplifier 124$a$. Similarly, the second receiver 114$b$ includes a second receive antenna 120$b$ coupled to a second ADC 122$b$ by a second receive amplifier 124$b$. Each receive antenna 120 receives a reflected signal 116$a$-116$d$ from each target 118$a$-118$b$ along with background noise that combined form a mixture signal 126$a$, 126$b$ in each receiver 114$a$-114$b$. The receive amplifier 124$a$-124$b$ in each receiver 114$a$-114$b$ amplifies the mixture signal 126$a$ and 126$b$ and adds receiver noise. Each of the receivers 114$a$-114$b$ or receive antennas 120$a$-120$b$ are separated by a predetermined distance "B" (FIG. 3). The predetermined distance "B" corresponds to a baseline between adjacent receive antennas 120$a$ and 120$b$.

The first ADC 122$a$ digitizes or samples the reflected signals 116$a$-116$b$ including noise or the mixture signal 126$a$ to provide a first digitized or sampled noisy input signal 128$a$. Similarly, the second ADC 122$b$ digitizes or samples the reflected signals 116$c$-116$d$ including noise or the mixture signal 126$b$ to provide a second digitized or sampled noisy input signal 128$b$. The receivers 114$a$ and 114$b$ may each include different components or arrangement of components in other embodiments.

The radar system 100 also includes a multiple input de-noiser 130 configured to de-noise the noisy input signals 128$a$ and 128$b$ from each of the plurality of receivers 114$a$ and 114$b$ or from each ADC 122$a$ and 122$b$ and to determine a time difference of arrival of the reflected signals 116$a$-116$d$ between the plurality of receivers 114$a$ and 114$b$ or between the first antenna 120$a$ and the second antenna 120$b$. The multiple input de-noiser 130 includes a plurality of neural network reservoirs 132 that interact with each other to enhance detection of the reflected signals 116$a$-116$d$ and determine the time difference of arrival of the reflected signals 116$a$-116$d$ between the plurality of receivers 114$a$ and 114b or between the first receive antenna 120a and the second receive antenna 120b. In accordance with the exemplary radar system 100 in FIG. 1, the multiple input de-noiser 130 includes a first neural network reservoir 132a and a second neural network reservoir 132b. In accordance with an embodiment, each neural network reservoir 132a and 132b is embodied in a reservoir computer or cognitive radar processor. An example of a reservoir computer or cognitive radar processor that may be used for each of the neural network reservoirs 132a and 132b is described in U.S. patent application Ser. No. 15/885,344, entitled "Below-Noise after Transmit (BAT) Chirp Radar," filed Jan. 31, 2018, which is assigned to one of the same assignees as the present application and which is incorporated herein by reference. Another example of a reservoir computer, cognitive radar processor or neuromorphic signal processor that may be used for each of the neural network reservoirs 132a and 132b is described in U.S. patent application Ser. No. 15/276,188, entitled "Signal Removal to Examine a Spectrum of Another Signal," filed Sep. 26, 2016, which is assigned to one of the same assignees as the present application and which is incorporated herein by reference. An example of a reservoir computer used for each of the neural network reservoirs will be described in more detail with reference to FIG. 4.

As described in more detail with reference to FIG. 5, neural network reservoir weights 134b of the second neural network reservoir 132b are adjusted by the first neural network reservoir 132a to enhance the detection of the reflected signals 116a-116d and to determine the time difference of arrival of the reflected signals 116a-116d between the plurality of receivers 114a and 114b or the first receive antenna 120a and the second receive antenna 120b. Signals 136 including data are transmitted from the first neural network reservoir 132a to the second neural network reservoir 132b to adjust weights 134b (FIG. 5) in the second neural network reservoir 132b to enhance the detection of the reflected signals 116a-116d and to determine the time difference of arrival of the reflected signals 116a-116d between the plurality of receivers 114a and 114b or the first receive antenna 120a and the second receive antenna 120b. The multiple input de-noiser 130 generates de-noised signals 138 for detecting the reflected signals 116a-116d and determining the angular resolution between the targets 118a and 118b. In accordance with an embodiment, the first neural network reservoir 132a sends information to the second neural network reservoir 132b to enhance the capability to predict the incoming signal or reflected signals 116a-116d. Examining the signal that is seen within the two reservoirs 132a and 132b allows a crosscorrelation of the signal as received by the two reservoirs 132a and 132b. The peak of the correlation will be at a time difference that corresponds to the time difference of arrival of the signal 116a-116d between the first and second neural network reservoirs 132a and 132b or the first receiver 114a and the second receiver 114b Because it is not known a priori which of the neural network reservoirs 132a or 132b will be the first to receive the signal, i.e., which of the platforms is closer to the target 118a and 118b, it is necessary that there be two sets of crossprediction, one from the first neural network reservoir 132a to the second neural network reservoir 132b, and another from the second neural network reservoir 132b to the first neural network reservoir 132a.

Figure 6:
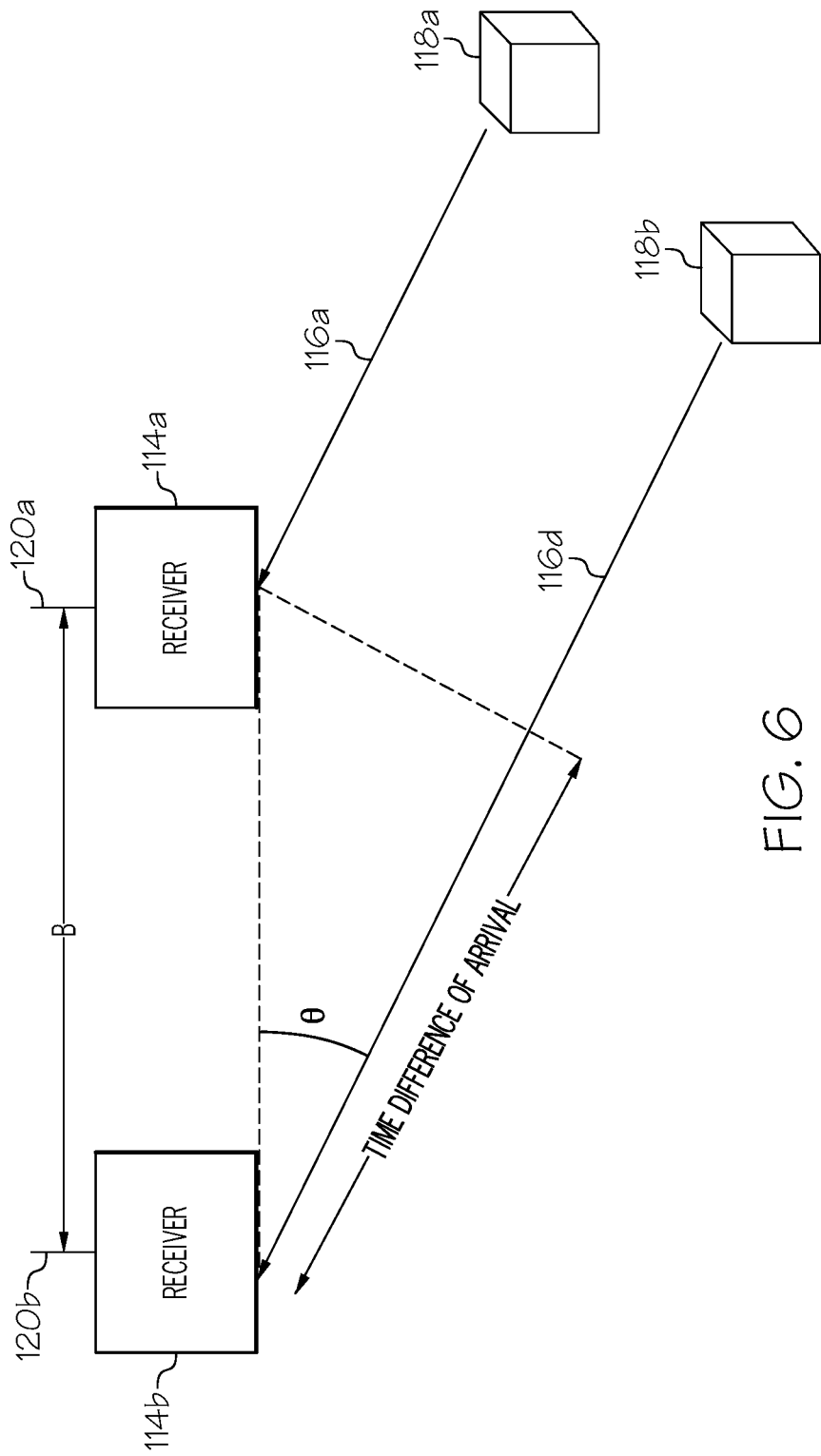
FIG. 6 is a diagram of an example of determining a time difference of arrival of the reflected signals between receivers or receive antennas of a radar system in accordance with an embodiment of the present disclosure.

The radar system 100 additionally includes a detection and angular resolution module 140 configured to determine an angular resolution 142 between the plurality of targets 118a-118b using the time difference of arrival of the reflected signals 116a-116d between the plurality of receivers 114a-114b. The receivers 114a and 114b are frequency, phase and time aligned with each other and the transmitter 102. Referring also to FIG. 6, FIG. 6 is a diagram of an example of determining the time difference of arrival of the reflected signals 116a-116d between receivers 114a and 114b or receive antennas 120a and 120b of the radar system 100 in accordance with an embodiment of the present disclosure. The time difference of arrival (TDOA) is then measured or determined based on how much later in time ($\Delta t$) the reflected signals 116a-116d are received by the second receiver 114b or second receive antenna 120b compared to the first receiver 114a or the first receiver antenna 120a based on the time the transmit antenna 108 transmitted the RF signal 104 or radar signal. The angle ($\theta$) in FIG. 6 is determined by Equation 1:

$$\theta = \cos^{-1}\left(TDOA * \left(\frac{c}{B}\right)\right) \quad \text{Equation 1}$$

Where c is the speed of light in a vacuum (about $3.0 \times 10^8$ meters/second) and B is the predetermined distance or baseline between the receivers 114a and 114b or receive antennas 120a and 120b in meters. The baseline B between the adjacent receive antennas 120a and 120b is substantially larger than an aperture "A" or size of the transmit antenna 108 as shown in FIG. 3. Also in the exemplary embodiment of FIG. 3, the receive antennas 120a and 120b each include a smaller aperture or size compared to the transmit antenna 108. In accordance with an embodiment, the baseline B is between about 100 and about 1000 times greater than the aperture A or size of the transmit antenna 108. In accordance with an embodiment and as illustrate in FIG. 3, each receive antenna 120a and 120b is configured to provide a broader signal beam 144 and a lower gain 146 than a signal beam 145 of the transmit antenna 108. The beamwidth of the signal beam 145 of the transmit antenna 108 is approximately the wavelength ($\lambda$) of the transmitted signal divided by the aperture A, diameter or size of the transmit antenna 145. In accordance with an example, the first receive antenna 120a and the second receive antenna 120b are omnidirectional antennas. The angular resolution ($\Delta\theta$) is provided by Equation 2:

$$\Delta\theta = \frac{d\theta}{dt}\Delta t = \frac{c/B}{\cos\theta}\Delta t \quad \text{Equation 2}$$

For a broad range of angles theta ($\theta$), the angular resolution is improved by a lower sampling time ($\Delta t$) by the analog-to-digital converters 122a and 122b and by a larger separation or baseline B between the receive antennas 120a and 120b. An angle measure to each target 118a-118b may be determined from the angular resolution ($\Delta\theta$). The angle measurement is limited in absolute accuracy by the Cramer-Rao bound. The angle measurement is dependent on the bandwidth of the reflected signals 116a-116d and the distinctiveness of the time history of the reflected signal 116a-116d since a cross-correlation is applied between the outputs of the receive antennas 120a and 120b. While the transmit antenna 108 in FIG. 3 is shown between the receive antennas 120a and 120b, in other embodiments, the transmit antenna 108 may be at other locations relative to the receive antennas 120a and 120b rather than between the receive antennas 120 and 120*b*. For example, the transmit antenna 108 on either side of the receive antennas 120*a* and 120*b*.

Figure 2:
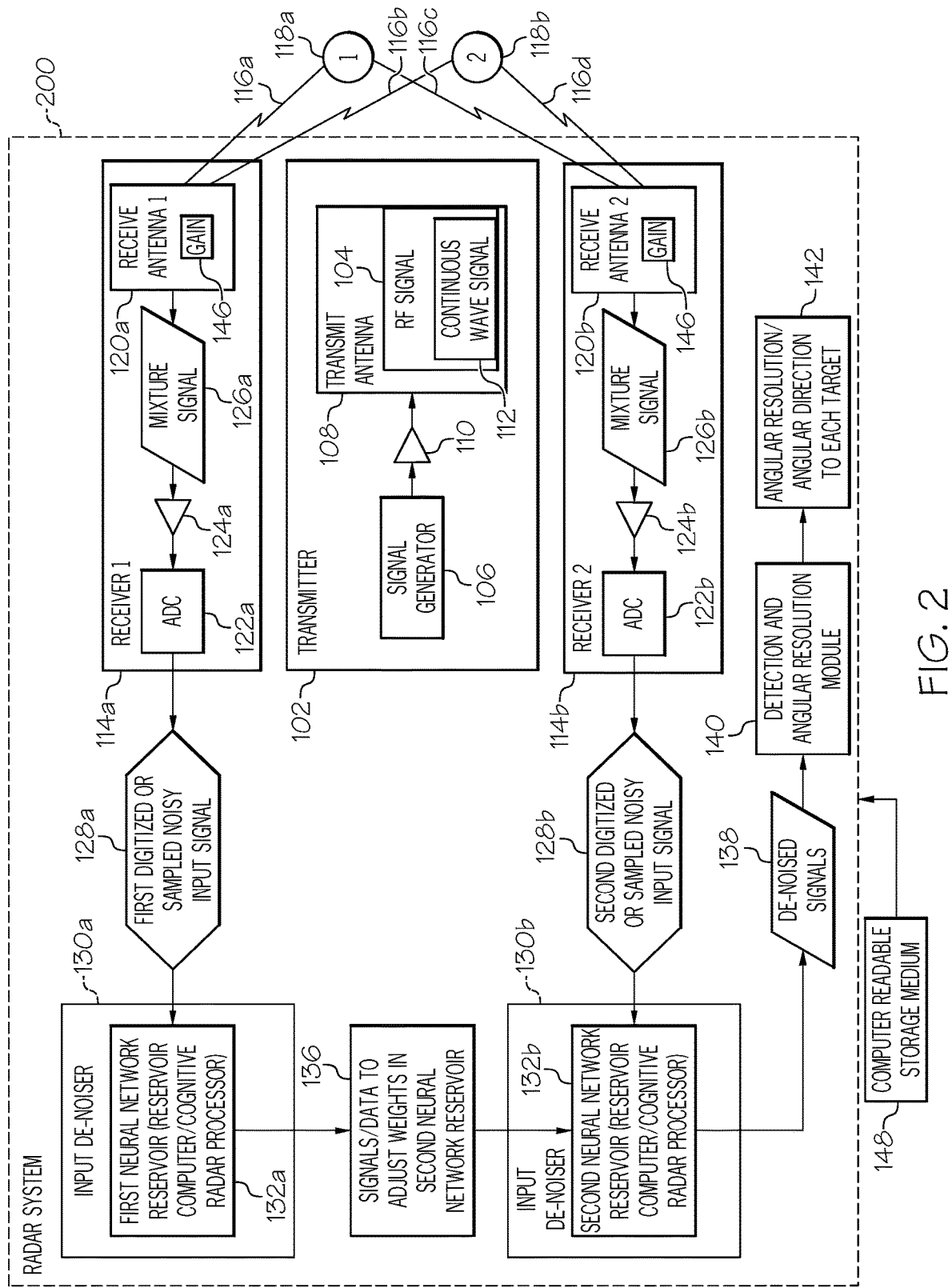
FIG. 2 is a block schematic diagram of an example of a radar system in accordance with another embodiment of the present disclosure.

Referring to FIG. 2, FIG. 2 is a block schematic diagram of an example of a radar system 200 in accordance with another embodiment of the present disclosure. The radar system 200 is similar to the radar system 100 in FIG. 1 except the multiple input de-noiser 130 includes a separate de-noiser 130*a* and 130*b* associated with each receiver 114*a* and 114*b* of the plurality of receivers 114. The separate de-noisers 130*a* and 130*b* each include a neural network reservoir 132*a*, 132*b* that interact with each other to enhance detection of the reflected signals 116*a*-116*d* and determine the time difference of arrival (TDOA) of the reflected signals 116*a*-116*d* between the plurality of receivers 114*a* and 114*b* similar to that described with reference to FIGS. 4 and 5.

In order to determine the angle of arrival (θ in FIG. 6) accurately, a distance between antenna phase centers of the transmit antenna 108 and receive antennas 120*a* and 120*b* needs to be known. There are at least two techniques for determining the distance between antenna phase centers. One technique uses two way time transfer (TWTT) between the receivers 114*a*-114*b* and the transmitter 102. Another technique used time reversal technology (TRT). Time reversal technology offers an opportunity for alignment of frequency phase and time, as well as, the creation of a precise downconversion reference frequency. In accordance with one or more embodiments, the transmitter 102 and the receivers 114*a* and 114*b* are frequency, phase and time aligned by using one of two way time transfer between the transmitter 102 and the receivers 114*a* and 114*b* or time reversal technology.

Figure 7:
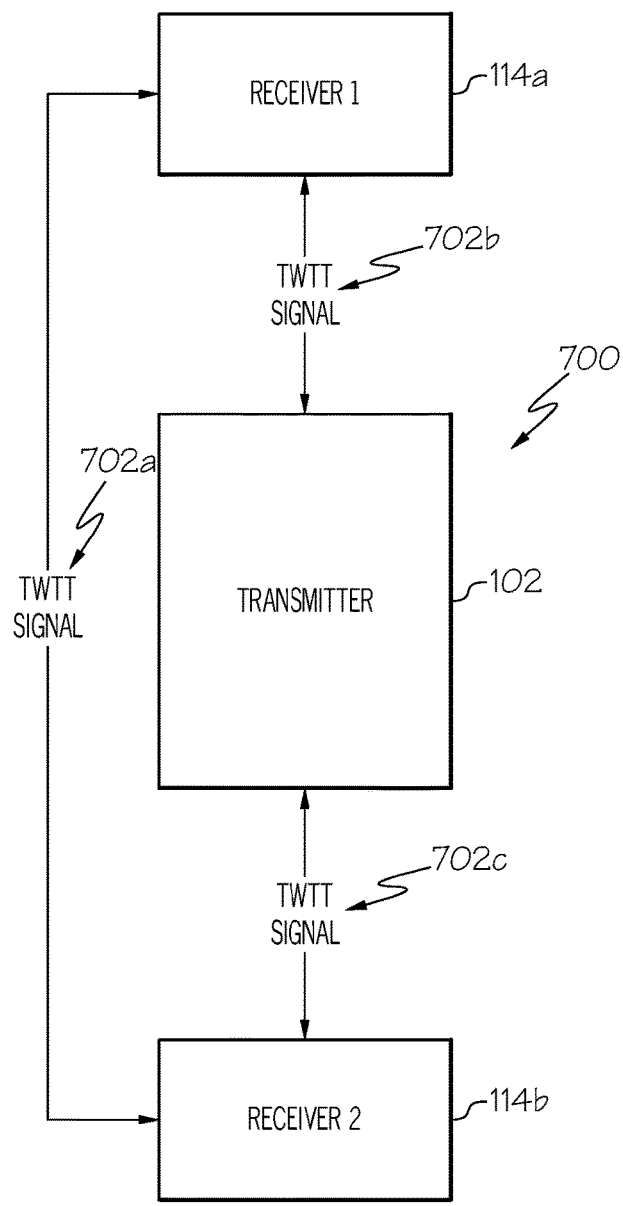
FIG. 7 is a block diagram illustrating two way time transfer for aligning frequency, phase and time between the transmitter and receivers of a radar system in accordance with an embodiment of the present disclosure.

Referring to FIG. 7, FIG. 7 is a block diagram illustrating two way time transfer 700 for aligning frequency, phase and time between the transmitter 102 and the receivers 114*a* and 114*b* of the radar system 100. Two way time transfer determines a distance between all the elements (transmitter 102 and receivers 114*a* and 114*b* and associated antennas) of the radar system 100. Communications between all the elements in FIG. 7 are periodically updated. The time for signals 702*a*-702*c* to go between elements of the radar system 100 and be returned establishes the distance between elements. A navigation solution updates the TWTT measurements with inertial motion measurements, so that no external information is required to determine the relative geometry.

Figure 8:
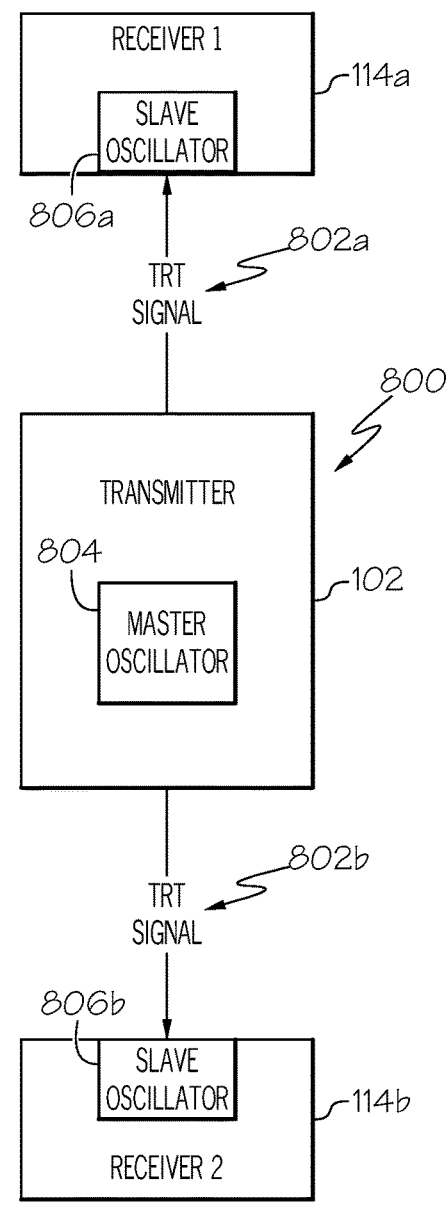
FIG. 8 is a block diagram illustrating time reversal technology for aligning frequency, phase and time between the transmitter and receivers of a radar system in accordance with another embodiment of the present disclosure.

Referring to FIG. 8, FIG. 8 is a block diagram illustrating time reversal technology 800 for aligning frequency, phase and time between the transmitter 102 and the receivers 114*a* and 114*b* in accordance with an embodiment of the present disclosure. Time Reversal Technology (TRT) 800 uses signals 802*a* and 802*b* from a master oscillator 804 in the transmitter 102 to slave oscillators 806*a* and 806*b* in the receivers 114*a* and 114*b* to match the master oscillator 804 frequency, phase and timing. In this manner, signals can be added coherently and a signal that can be used in the receiver 114*a* or 114*b* downconversion stage is automatically produced.

While the master oscillator 804 is shown as being embodied in the transmitter 102 in the exemplary embodiment in FIG. 8, in other embodiments, the master oscillator 804 may be embodied in one of the receivers 114*a* or 114*b* and the slave oscillators 806*a* and 806*b* may be embodied in the transmitter 102 and the other receiver 114*a* or 114*b*.

Referring back to FIG. 4, FIG. 4 is a diagram of an example of a neural network reservoir 132 of the multiple input de-noiser 130 in accordance with an embodiment of the present disclosure. In accordance with an example, the neural network reservoir 132 is also used for each of the de-noisers 130*a* and 130*b* in FIG. 2. The neural network reservoir 132 may also be referred to as a reservoir computer or cognitive radar processor. The neural network reservoir 132 includes a cognitive signal de-noising architecture 400 that is based on a form of neuromorphic (brain-inspired) signal processing known as reservoir computing. Reservoir computing is a special form of a recurrent neural network 402 (a neural network with feedback connections) that operates by projecting the input signal vector or input signal 128 (128*a* or 128*b* in FIGS. 1 and 2) into a high-dimensional or multi-dimensional reservoir state-space representation 404 which contains an equivalent dynamical model of the signal generation process capturing all of the available and actionable information about the input signal 128. The neural network reservoir 132 or reservoir computer has readout layers 406 that can be trained, either off-line or on-line, to learn desired outputs by utilizing state functions. Accordingly, the neural network reservoir 132 has the power of a recurrent neural network 402 to model non-stationary (time-varying) processes and phenomena, but with simple readout layers 406 and training algorithms that are both accurate and efficient. The neural network reservoir 132 is configured to implement an adaptable state-space filter or time-varying filters 408.

Figure 4:
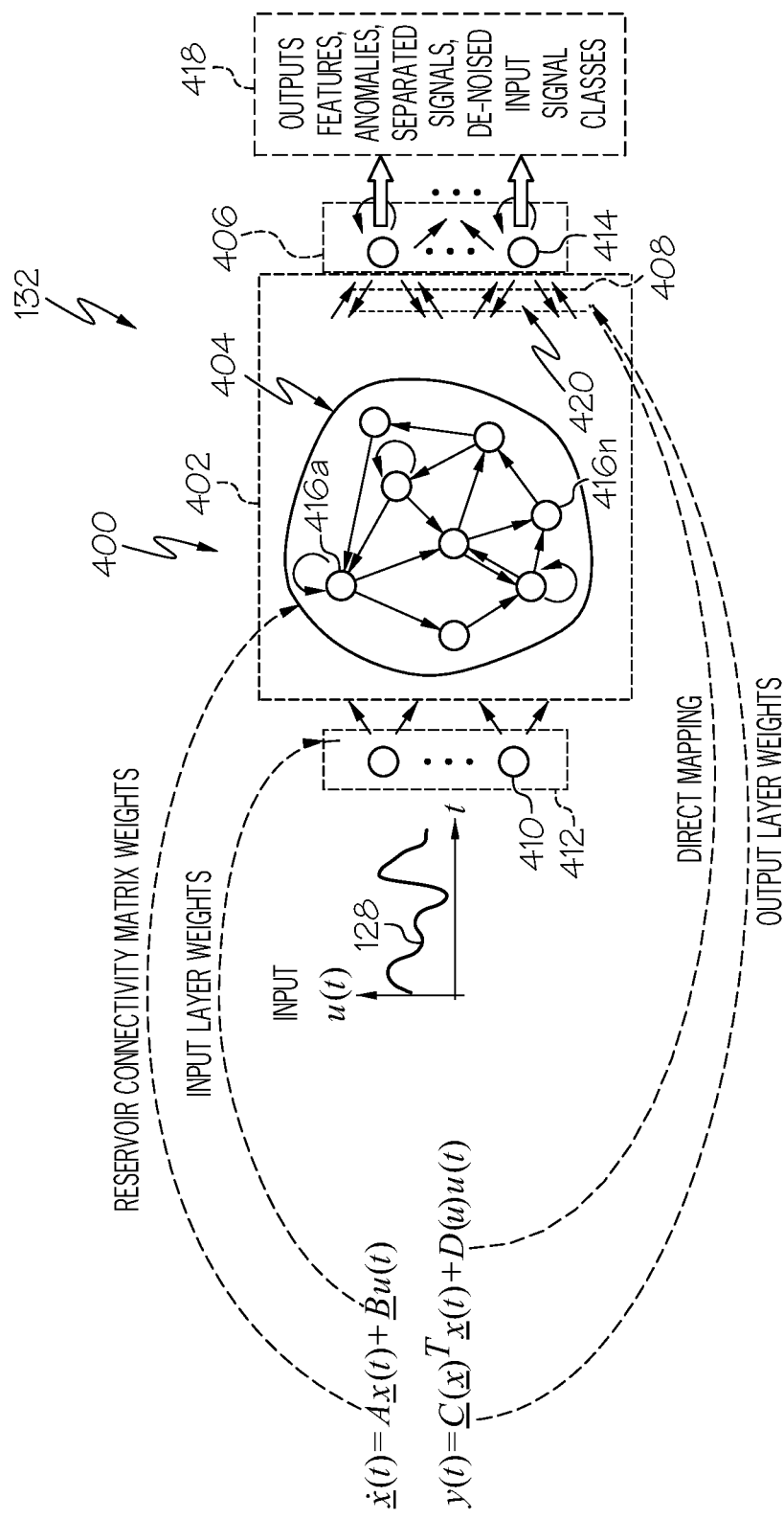
FIG. 4 is a diagram of an example of a neural network reservoir of a de-noiser or a multiple input de-noiser in accordance with an embodiment of the present disclosure.

In accordance with an embodiment, the neural network reservoir 132 has the following state-space representation as illustrated in FIG. 4:

$$\dot{\underline{x}}(t) = \underline{A}\underline{x}(t) + \underline{B}u(t)$$

$$y(t) = \underline{C}(t)^T \underline{x}(t) + D(t)u(t)$$

Where $\underline{A}$ is the reservoir connectivity matrix that determines the filter pole locations, $\underline{B}$ is a vector of weights 410 of the input layer 412 that map the input 128 to the neural network reservoir 132, $\underline{C}(t)$ is a set of tunable output layer weights 414 that map the reservoir states 416*a*-416*n* to the outputs 418 or de-noised reservoir state signals and determine the zero filter locations of the filters 408. D(t) is the (rarely used) direct mapping from input 128 to output 418. Similarly, the output layer weights ($\underline{C}$) determine the filter zero locations of the filters 408. FIG. 4 illustrates the direct correspondence between parameters of the state-space representation 404 and components in the neural network reservoir 132. As the tunable output layer weights 414 are adaptable, the neural network reservoir 132 implements an adaptable state-space filter 420 where the poles are fixed, but the zeros are adapted in real-time based on the input signal 128. The neural network reservoir 132 maps an input signal vector or input signal 128 to the high-dimensional state-space representation 404 that models the underlying time-varying dynamics of the signal generation process. The reservoir states 416*a*-416*n* can be mapped to useful outputs 418, including de-noised inputs, signal classes, separated signals, and anomalies using the trainable linear readout layers 406. There is a direct correspondence between state-space representation components and parameters in the neural network reservoir 132.

Figure 5:
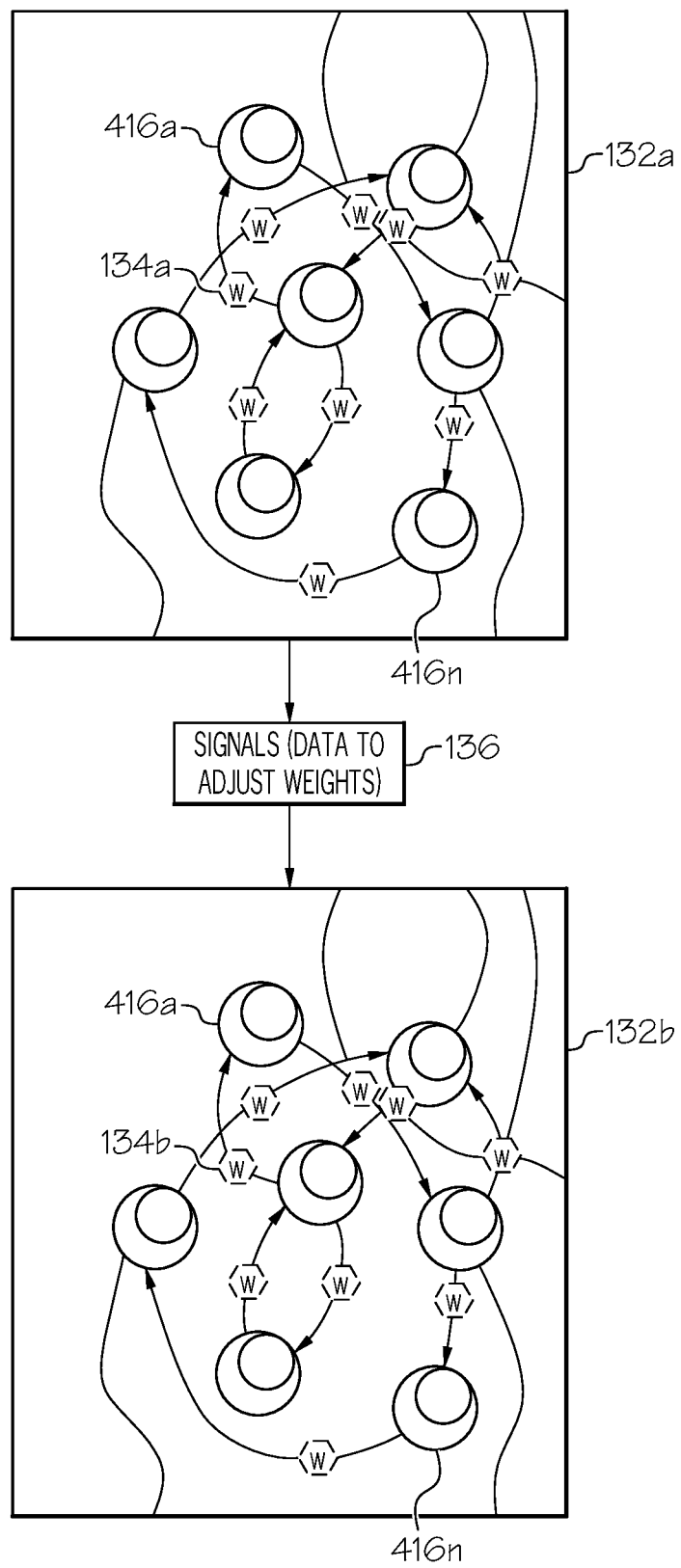
FIG. 5 is a diagram of an example of a first neural network reservoir interacting with a second neural network reservoir of a multiple input de-noiser to enhance detection of the reflected signals and to determine a time difference of arrival of the reflected signals between receivers or receive antennas in accordance with an embodiment of the present disclosure.

FIG. 5 is a diagram of an example of the first neural network reservoir 132*a* interacting with the second neural network reservoir 132*b* of the multiple input de-noiser 130 to enhance detection of the reflected signals 116*a*-116*d* and to determine a time difference of arrival (TDOA) of the reflected signals 116*a*-116*d* between receivers 114*a* and 114*b* or receive antennas 120*a* and 120*b* in accordance with an embodiment of the present disclosure. Similar to that previously described, signals 136 including data are transmitted from the first neural network reservoir 132a to the second neural network reservoir 132b for adjusting the weights 134b in the second neural network reservoir to enhance and/or more accurately detect the reflected signals 116a-116d and to determine a time difference of arrival (TDOA) of the reflected signals 116a-116d.

Figure 9:
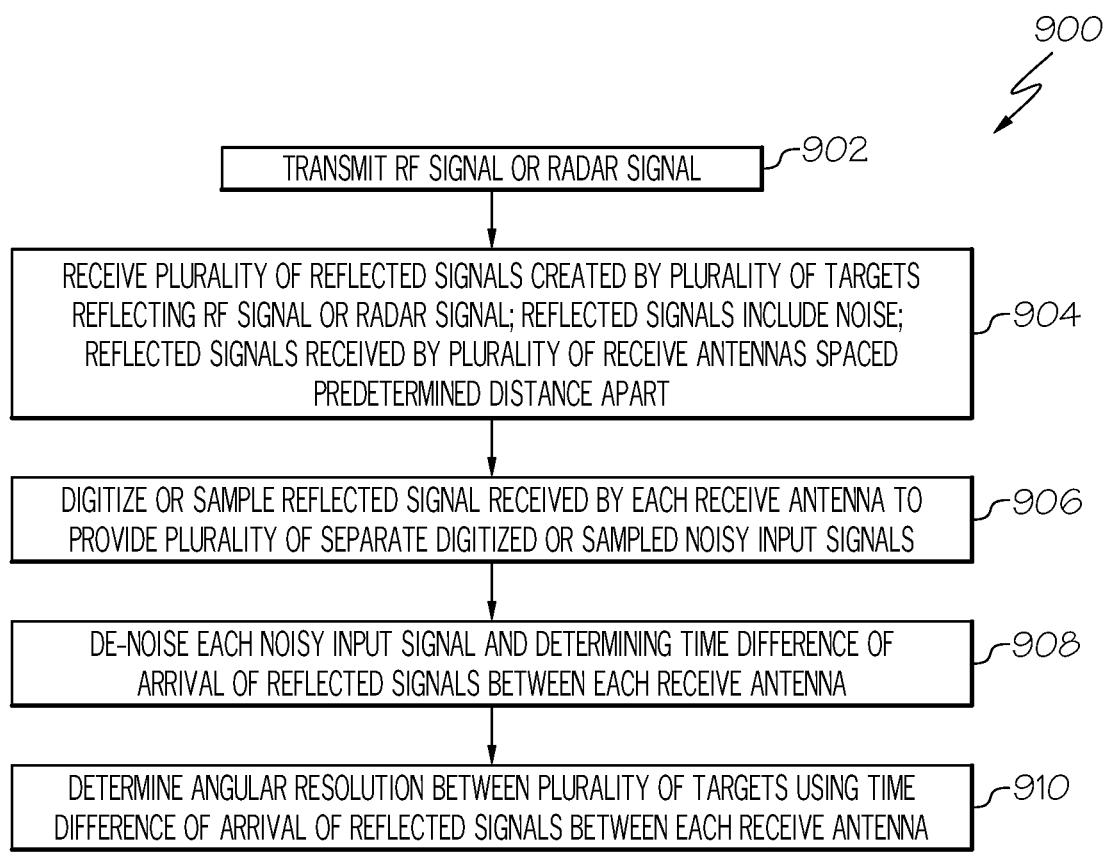
FIG. 9 is a flow chart of an example of a method for determining angular resolution between a plurality of targets in accordance with an embodiment of the present disclosure.

FIG. 9 is a flow chart of an example of a method 900 for determining angular resolution between a plurality of targets in accordance with an embodiment of the present disclosure. In accordance with an embodiment, the method 900 is embodied in and performed by the radar system 100 in FIG. 1 and the radar system 200 in FIG. 2. The method 900 may also be embodied in computer program instructions stored on a computer program product 148 (FIGS. 1 and 2) similar to that previously described. In block 902, a radio frequency (RF) signal or radar signal is transmitted by an antenna of a transmitter.

In block 904, a plurality of reflected signals are created by a plurality of targets reflecting the RF signal or radar signal. The reflected signals include background noise. The reflected signals are received by a first receive antenna and by a second receive antenna that are spaced a predetermined distance apart. The predetermined distance is referred to as a baseline of the receive antennas.

In block 906, a first input signal from the first receive antenna is de-noised by a multiple input de-noiser and a second input signal from the second receive antenna is de-noised by the multiple input de-noiser.

In block 908, a time difference of arrival (TDOA) of the reflected signals between the first receive antenna and the second receive antenna is determined from the de-noised first input signal and the de-noised second input signal by the multiple input de-noiser.

In block 910, an angular resolution between the plurality of targets is determined using the time difference of arrival of the reflected signals between the first receive antenna and the second receive antenna.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A radar system, comprising:
a transmitter for transmitting a radio frequency (RF) signal or a radar signal;
a plurality of receivers, each receiver receiving a plurality of reflected signals created by a plurality of targets reflecting the RF signal or radar signal, the reflected signals comprising background noise, and wherein each of the receivers are separated by a predetermined distance;
a multiple input de-noiser configured to de-noise input signals from the plurality of receivers and to determine a time difference of arrival of the reflected signals between the plurality of receivers, wherein the multiple input de-noiser comprises a plurality of neural network reservoirs that interact with each other to enhance detection of the reflected signals and determine the time difference of arrival of the reflected signals between the plurality of receivers; and
a detection and angular resolution module configured to determine an angular resolution between the plurality of targets using the time difference of arrival of the reflected signals between the plurality of receivers.

2. The radar system of claim 1, wherein neural network reservoir weights of a second neural network reservoir of the plurality of neural network reservoirs are adjusted by a first neural network reservoir of the plurality of neural network reservoirs to enhance the detection of the reflected signals and determine the time difference of arrival of the reflected signals between the plurality of receivers.

3. The radar system of claim 1, wherein the multiple input de-noiser comprises a separate de-noiser associated with each receiver of the plurality of receivers, wherein the separate de-noisers each comprise a neural network reservoir that interact with each other to enhance detection of the reflected signals and determine the time difference of arrival of the reflected signals between the plurality of receivers.

4. The radar system of claim 1, wherein the RF signal or the radar signal transmitted by the transmitter comprises a continuous wave signal.

5. The radar system of claim 1, wherein the transmitter comprises a transmit antenna and the plurality of receivers each comprise a receive antenna, wherein a baseline between adjacent receive antennas is substantially larger than an aperture or size of the transmit antenna, wherein the baseline corresponds to the predetermined distance between the adjacent receive antennas.

6. The radar system of claim 5, wherein each receive antenna is configured to provide a broader signal beam and a lower gain than the transmit antenna.

7. The radar system of claim 1, wherein the plurality of receivers are frequency, phase and time aligned with each other and the transmitter.

8. The radar system of claim 7, wherein the transmitter and receivers are frequency, phase and time aligned by using one of two way time transfer between the transmitter and the receivers, or time reversal technology.

9. A radar system, comprising:
- a first receive antenna for receiving a plurality of reflected signals created by a plurality of targets reflecting a radio frequency (RF) signal or radar signal, the reflected signals comprising background noise;
- a first analog-to-digital converter (ADC) that digitizes or samples the reflected signals received by the first receive antenna to provide a first digitized or sampled noisy input signal;
- a second receive antenna for receiving the plurality of reflected signals created by the plurality of targets reflecting the RF signal or radar signal, wherein the second receive antenna is spaced at a predetermined distance from the first receive antenna;
- a second analog-to-digital converter (ADC) that digitizes or samples the reflected signals received by the second receive antenna to provide a second digitized or sampled noisy input signal; and
- a multiple input de-noiser configured to de-noise the noisy input signal from each ADC and to determine a time difference of arrival of the reflected signals between the first receive antenna and the second receive antenna, wherein the multiple input de-noiser comprises a plurality of neural network reservoirs that interact with each other to enhance detection of the reflected signals and determine the time difference of arrival of the reflected signals between the plurality of receivers; and
- a detection and angular resolution module configured to determine an angular resolution between the plurality of targets using the time difference of arrival of the reflected signals between the receive antennas.

10. The radar system of claim 9, wherein neural network reservoir weights of a second neural network reservoir of the plurality of neural network reservoirs are adjusted by a first neural network reservoir of the plurality of neural network reservoirs to enhance detection of the reflected signals and determine the time difference of arrival of the reflected signals between the first receive antenna and the second receive antenna.

11. The radar system of claim 9, further comprising a transmit antenna for transmitting the RF signal or a radar signal.

12. The radar system of claim 11, wherein the RF signal or the radar signal transmitted by the transmit antenna comprises a continuous wave signal.

13. The radar system of claim 11, wherein a baseline of the first receive antenna and the second receive antenna is substantially larger than an aperture or size of the transmit antenna, wherein the baseline corresponds to the predetermined distance between the first receive antenna and the second receive antenna.

14. The radar system of claim 13, wherein the baseline of the first receive antenna and the second receive antenna is between about 100 and about 1000 times greater than the aperture or size of the transmit antenna.

15. The radar system of claim 11, wherein the first receive antenna and the second receive antenna are each configured to provide a broader signal beam and a lower gain than the transmit antenna.

16. The radar system of claim 11, wherein the first receive antenna and the second receive antenna are omnidirectional antennas.

17. The radar system of claim 11, wherein the first receive antenna and the second receive antenna each comprise a smaller aperture or size than the transmit antenna.

18. A method for determining an angular resolution between a plurality of targets, comprising:
- transmitting a radio frequency (RF) signal or radar signal;
- receiving a plurality of reflected signals created by a plurality of targets reflecting the RF signal or radar signal, the reflected signals comprising background noise, wherein the reflected signals are received by a first receive antenna and by a second receive antenna that are spaced a predetermined distance apart;
- de-noising a first input signal from the first receive antenna by a multiple input de-noiser wherein the multiple input de-noiser comprises a plurality of neural network reservoirs that interact with each other to enhance detection of the reflected signals and determine a time difference of arrival of the reflected signals between the plurality of receivers;
- de-noising a second input signal from the second receive antenna by the multiple input de-noiser;
- determining the time difference of arrival of the reflected signals between the first receive antenna and the second receive antenna from the de-noised first input signal and the de-noised second input signal by the multiple input de-noiser; and
- determining an angular resolution between the plurality of targets using the time difference of arrival of the reflected signals between the first receive antenna and the second receive antenna.

19. The method of claim 18, further comprising digitizing or sampling the reflected signal received by each receive antenna to provide a plurality of separate digitized or sampled noisy input signals for de-noising by the multiple input de-noiser.

20. The method of claim 18, further comprising adjusting, by a first neural network reservoir, neural network reservoir weights of a second neural network reservoir of the plurality of neural network reservoirs to enhance the detection of the reflected signals and determine the time difference of arrival of the reflected signals.

* * * * *